United States Patent
Serizawa et al.

(10) Patent No.: US 8,038,111 B2
(45) Date of Patent: Oct. 18, 2011

(54) TEMPORARY FIXING STRUCTURE FOR INFORMATION DEVICE

(75) Inventors: Shinji Serizawa, Tokyo (JP); Takahiro Ikunami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 627 days.

(21) Appl. No.: 11/919,079

(22) PCT Filed: Apr. 11, 2006

(86) PCT No.: PCT/JP2006/307664
§ 371 (c)(1),
(2), (4) Date: Oct. 23, 2007

(87) PCT Pub. No.: WO2006/137208
PCT Pub. Date: Dec. 28, 2006

(65) Prior Publication Data
US 2009/0020675 A1 Jan. 22, 2009

(30) Foreign Application Priority Data
Jun. 21, 2005 (JP) .................. 2005-180883

(51) Int. Cl.
*A47B 96/00* (2006.01)
*A47K 5/00* (2006.01)
*E04G 5/06* (2006.01)
(52) U.S. Cl. .............. 248/222.51; 248/317; 248/324
(58) Field of Classification Search ............ 248/222.51, 248/222.52, 317, 324, 341, 917, 923, 325
See application file for complete search history.

(56) References Cited

U.S. PATENT DOCUMENTS

| | | | | |
|---|---|---|---|---|
| 2,533,050 A | * | 12/1950 | Runyen | 182/88 |
| 2,839,349 A | * | 6/1958 | Culver | 312/323 |
| 2,967,040 A | * | 1/1961 | Picha | 248/324 |
| 4,184,725 A | * | 1/1980 | Spangler | 312/233 |
| 4,412,478 A | * | 11/1983 | Osher et al. | 454/195 |
| 4,460,145 A | * | 7/1984 | Ando | 248/447 |
| 5,244,272 A | * | 9/1993 | Thompson | 312/334.23 |
| 5,267,714 A | * | 12/1993 | Nelson, II | 248/222.51 |
| 5,944,293 A | * | 8/1999 | Loy | 248/220.21 |
| 6,045,100 A | * | 4/2000 | Shields | 248/222.51 |
| 2003/0213884 A1 | | 11/2003 | Ikunami | |
| 2004/0141095 A1 | | 7/2004 | Quinno et al. | |

FOREIGN PATENT DOCUMENTS

| | | |
|---|---|---|
| DE | 196 12 843 A1 | 10/1997 |
| DE | 10 2004 036 458 A1 | 3/2005 |
| DE | 10 2004 008 791 B3 | 9/2005 |
| EP | 0 406 519 A1 | 1/1991 |
| JP | 1-35504 Y2 | 10/1989 |
| JP | 2001-213351 A | 8/2001 |
| JP | 2003-281921 A | 10/2003 |
| JP | 2003-323126 A | 11/2003 |
| JP | 2003-333458 A | 11/2003 |
| JP | 2005-57679 A | 3/2005 |

* cited by examiner

*Primary Examiner* — Amy J Sterling
(74) *Attorney, Agent, or Firm* — Birch, Stewart, Kolasch & Birch, LLP

(57) ABSTRACT

A temporary fixing structure includes one hooking part 14*a* provided on a ceiling of a compartment or a room; the other hooking part 7*a* that is provided on an information device 1, and is rotatably hooked on the one hooking part 14*a*; and a stopper holding back rotation of the information device due to self-weight moment exerted on the information device 1 in hooked condition of these hooking parts 14*a* and 7*a* in a temporally fixed posture of the information device.

7 Claims, 5 Drawing Sheets

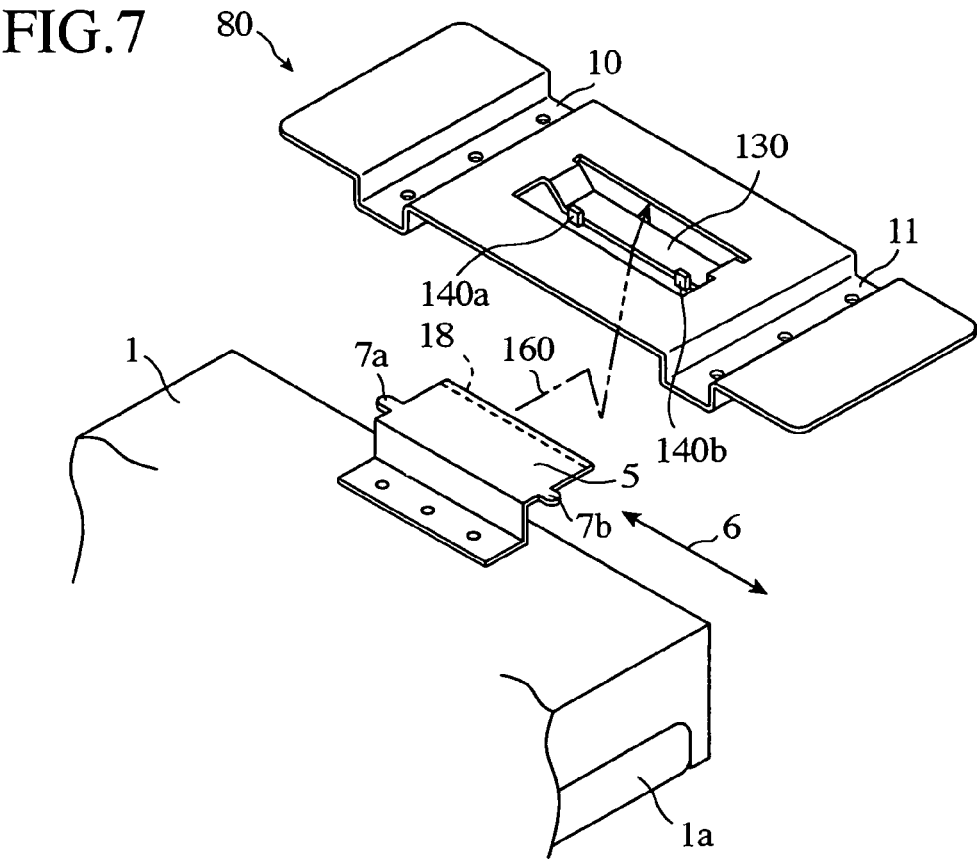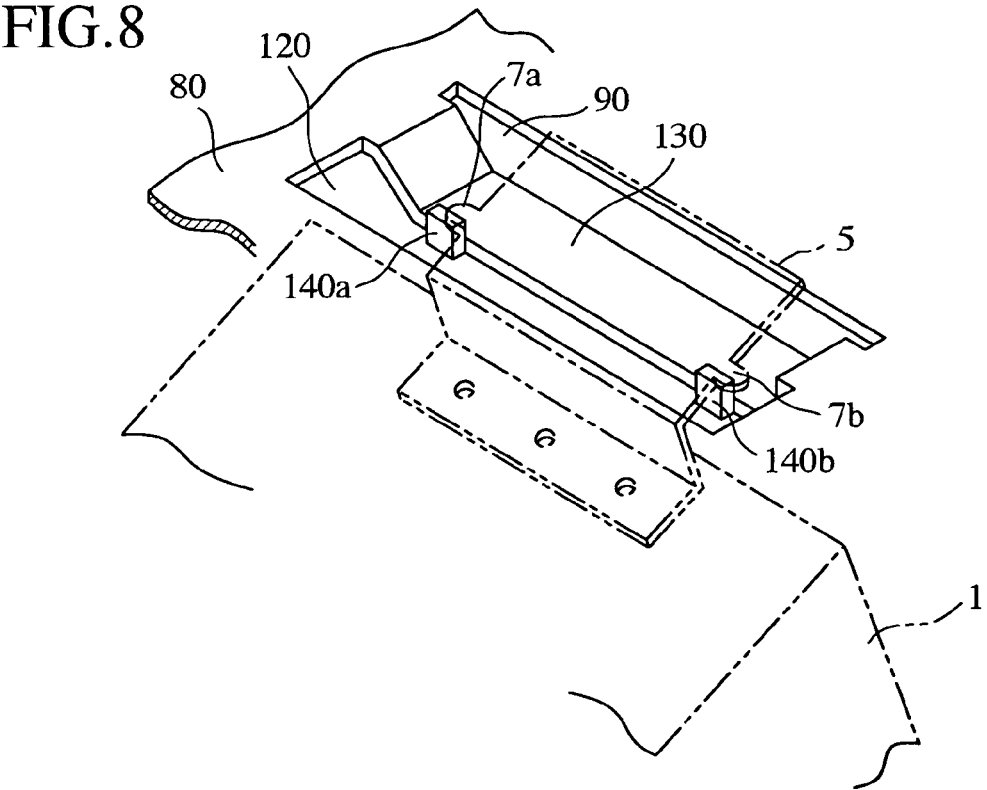

TEMPORARY FIXING STRUCTURE FOR INFORMATION DEVICE

TECHNICAL FIELD

The present invention relates to a temporary fixing structure for information devices, including a display etc, attached to a ceiling of a vehicle, an electric railcar, a vessel, or a room of a house.

BACKGROUND ART

In securing an information device to a ceiling of a compartment or a room, it has been accustomed determining a path of wiring of a harness and the distance thereof in situations where a temporary position is located in the vicinity of an actual setting position and then the information device is moved to the temporary position. However, the information device is generally heavy and so a work such as wiring of the harness while holding the device by a worker is not merely dangerous but also lowers workability thereof.

To break such a situation, one can think out a remedy of temporary fixing the information device to the temporary position; however, it eventually comes to the same thing in a demanding task as heavy goods must be lifted close to the ceiling even in the temporary fixation. Conventionally, known temporary fixing structures for electronic devices include a technology intended for the prevention of falling of the device during screw cramping (e.g., see Patent Document 1).

The technology disclosed in the above Patent Document 1 is defective in that the device body should be lifted such that first lugs of the bracket are inserted in their respective through holes after a bracket is fixed on the ceiling of a vehicle, and further, a fitting relation between a concave and a convex has to be established with the device lifting.

Patent Document 1: JP-A2003-333458

The temporary fixing structure for electronic devices disclosed in the Patent Document is arranged to insert a connecter as well from the side of the device body, and therefore, there is no gap between the device body and the ceiling in the inside of the vehicle on which the device is mounted in temporarily fixed condition. Accordingly, the temporary fixing structure disclosed therein is not suited for an insertion of the connector from a gap between the device body and the ceiling in the inside of the vehicle on which the device is mounted.

The present invention has been made to solve the above-mentioned problems, and an object of the present invention is to provide a temporary fixing structure for an information device able to easily bring the information device into temporarily fixed condition, and to take any temporally fixed posture.

DISCLOSURE OF THE INVENTION

The temporary fixing structure for an information device according to the present invention includes one hooking part provided on a ceiling of a compartment or a room; the other hooking part that is provided on the information device, and is rotatably hooked on the one hooking part; and a stopper holding back rotation of the information device in a temporarily fixed posture of the information device in hooked condition of these hooking parts.

According to the present invention, it can easily bring the information device into temporarily fixed condition, and may assume any temporally fixed posture.

BRIEF DESCRIPTION OF THE DRAWINGS

FIG. 7 is an enlarged oblique view of the device side bracket and the ceiling bracket.

FIG. 8 is an oblique view showing a hooked state of the hooking parts of the information device hooked on hooking parts provided on the ceiling bracket.

BEST MODE FOR CARRYING OUT THE INVENTION

Embodiments of the present invention will now be described with reference to the accompanying drawings in order to explain the present invention in more detail.

First Embodiment

Figure 1:
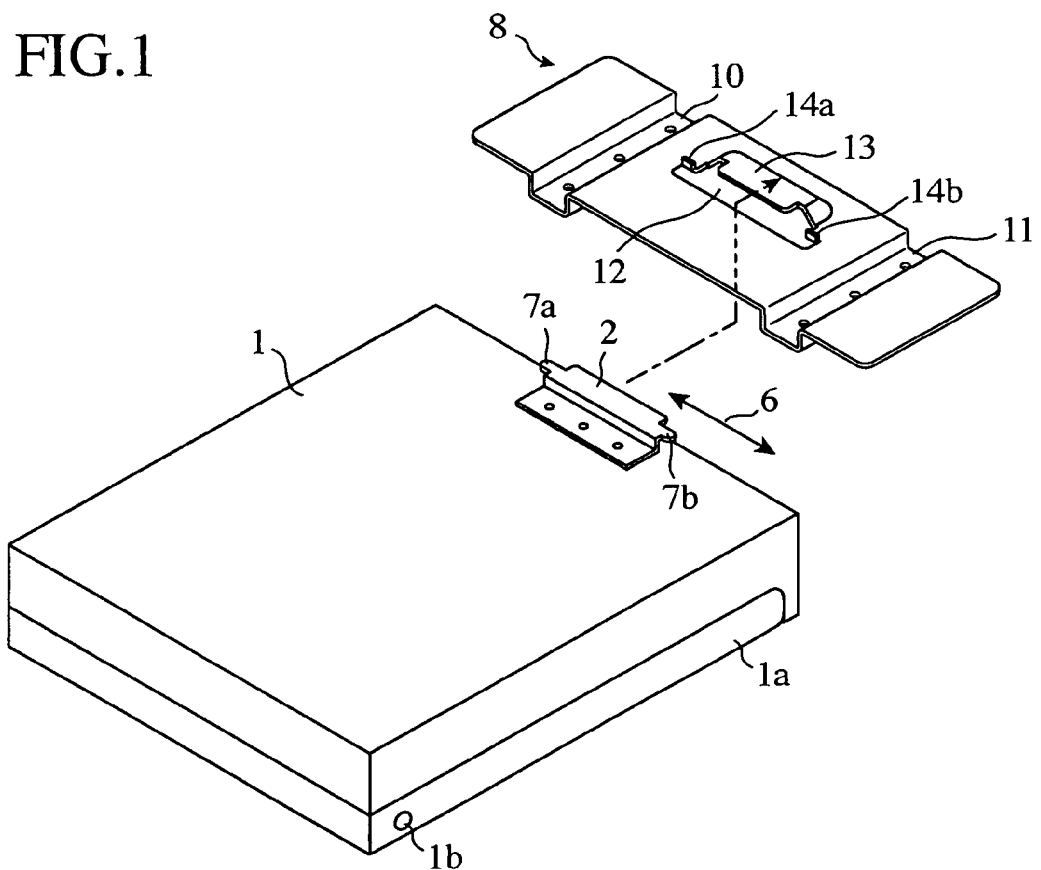
FIG. 1 is an oblique view of a ceiling bracket and an information device to be temporarily fixed on the bracket.
Figure 2:
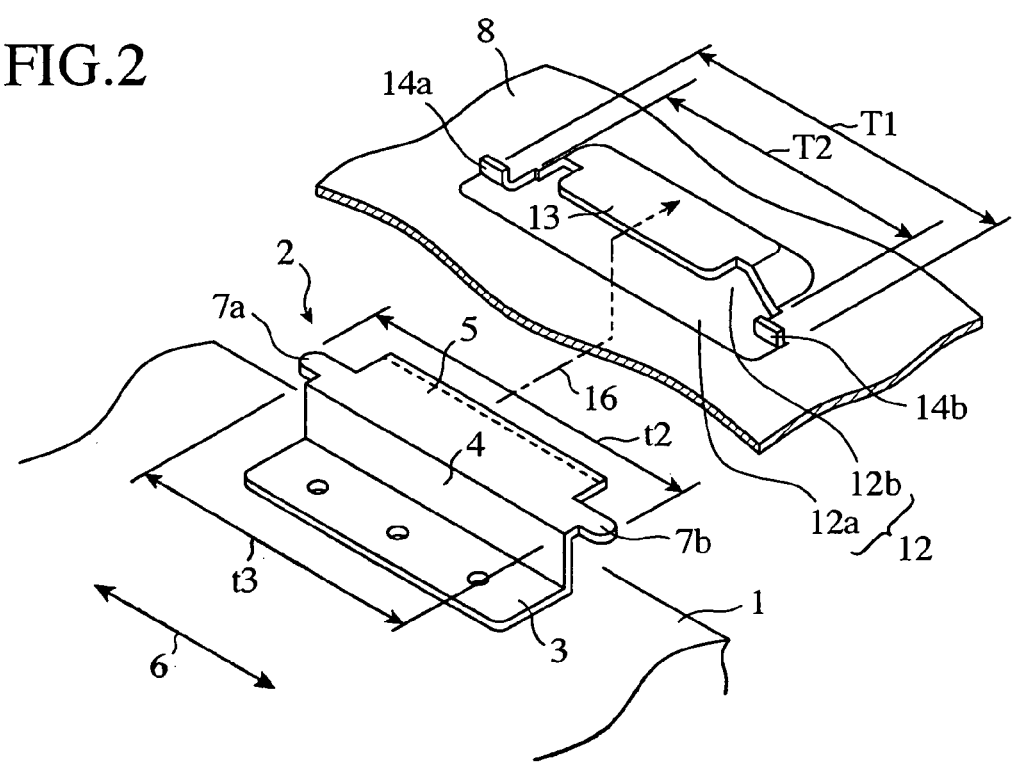
FIG. 2 is an enlarged oblique view of a device side bracket and the ceiling bracket.

Referring to FIG. 1 and FIG. 2 in which important parts of FIG. 1 are shown in magnified scale, a rectangular information device 1 has a bent-up piece-like device side bracket 2 fixed on the top of one end thereof. The bracket 2 has an attaching part 3 made of a flat plate tightly contacted to the top of the information device 1; a rising part 4 bent perpendicularly (upward) relative to the attaching part 3; and a tabular part 5 bent perpendicularly (horizontally) relative to the rising part 4. In the tabular part 5, hooking parts 7a, 7b are provided partially projecting in a widthwise direction 6 from both ends of the tabular part.

Figure 3:
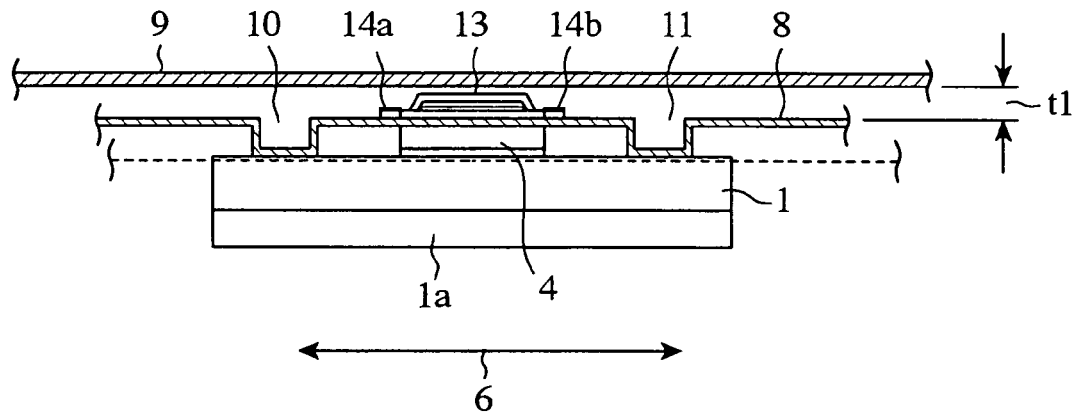
FIG. 3 is a sectional view explaining a structure of a ceiling in the inside of a vehicle.

It is a ceiling bracket 8 positioned on a ceiling in the inside of a vehicle that is shown at the upper right off to the information device 1. As shown in FIG. 3, the ceiling bracket 8 is located under an external wall plate 9 forming a roof of the vehicle, and is a space t1 between the external wall plate 9 and the bracket itself. The ceiling bracket 8 has the width larger than that of the information device 1 in the widthwise direction 6, and has two groove-shaped parts 10, 11 at intervals. In the final attachment state of the information device 1, as also shown in FIG. 3, these groove-shaped parts 10, 11 are closely contacted and screwed tightly to the top of the information device 1. A broken line shows a lining in the inside of the vehicle.

A part between these groove-shaped parts 10, 11 forms a flat tabular part, and the center thereof in the widthwise direction 6 forms a T-shaped opening 12. The opening 12 consists of a large-width part 12a having the width T1 located nearest and a small-width part 12b having the width T2 located at the back side thereof. These large-width part 12a and small-width part 12b are communicated to each other. Further, an up-convexed part is formed by means of drawing such that the part encircles the edge of the small-width part 12b. This up-convexed part is referred to as a roof member 13.

Referring to FIG. 2, convex piece hooking parts 14a, 14b each consisting of a raised piece are formed in a boundary (drop) between the large-width part 12a and the small-width part 12b. In order to hook the hooking parts 7a, 7b on the hooking parts 14a, 14b in temporarily fixing the information device 1, the hooking parts 7a, 7b have to go through the large-width part 12a from the under toward above, which requires that the external dimension t2 between the hooking parts 7a and 7b be smaller than the width T1 and have the length enough to abut with the hooking parts 14a and 14b, respectively. Here, the dimension t2 is set to be substantially equal to the external dimension between the hooking parts 14a and 14b. Further, the width t3 of the tabular part 5 is set to the size allowing a loose engagement in the width T2.

In temporarily fixing the information device 1 on the ceiling bracket 8, after the tabular part 5 of the device side bracket 2 is passed through the large-width part 12a from the under toward above of the ceiling bracket 8 as shown by an arrow 16, while holding the information device 1 by hands, the hooking parts 7a, 7b thereof are moved to the back side of the hooking parts 14a, 14b, and then the hooking parts 7a, 7b are brought into engagement with the hooking parts 14a, 14b to hook the hooking parts 7a, 7b thereon by lowering the information device 1. At that time, the tabular part 5 is located under the roof member 13.

Figure 4:
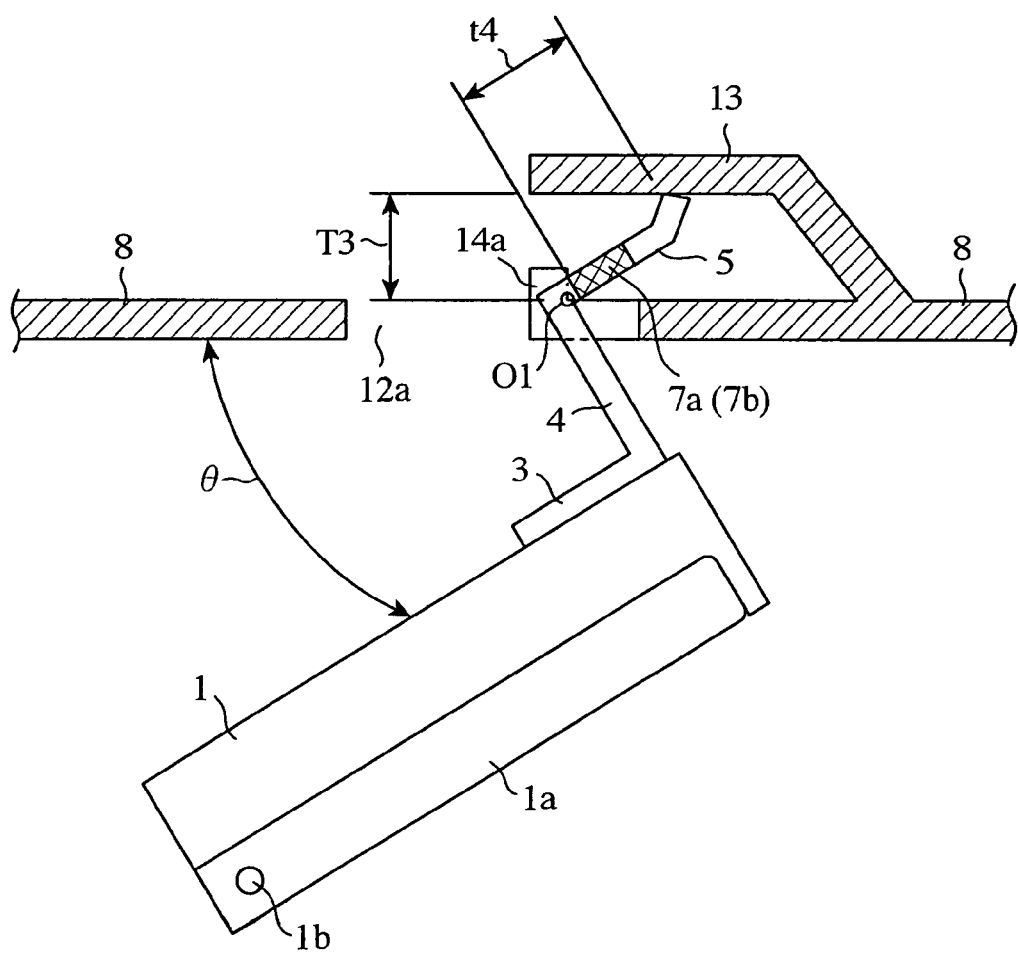
FIG. 4 is a sectional view of important parts explaining the information device in temporarily fixed condition.

Gradually relaxing a force of the hands supporting the information device 1 in such a situation leads to the information device 1 being rotated due to self-weight moment, with a contact O1 between the hooking parts 7a, 7b and the hooking parts 14a, 4b as a fulcrum. However, as shown in FIG. 4, in the course of rotation, the end of the tabular part 5 abuts against a roof member 13 and hampers the rotation. That is, the rotation of the information device 1 due to the self-weight moment of the information device 1 is impeded by the abutment of the end of the tabular member 5 that is a member integrally formed with the hooking parts 7a, 7b, against the roof member 13 that is a member integrally formed with the ceiling bracket 8. The up-convexed roof member 13, which is provided on the ceiling bracket 8, serves as a stopper. In this way, the information device 1 is stably held at the temporally fixed posture inclined at an angle of θ to the horizontal, and is secure against falling.

This temporally fixed posture is inclined at an angle to a regular fixed posture, and the rising part 4 provides a space between the top of the information device 1 and the ceiling bracket 8, which permits an insertion of the connector and wiring of the harness.

The inclination of the temporally fixed posture can be adjusted by changing the width t4 of the tabular part 5 from the end thereof to the hooking part 7a (7b) and the height T3 of the roof member 13, and a change of these dimensions according to the situations makes possible to meet a variety of circumstances. The adjustment of the inclination of the information device in the temporally fixed posture to the optimum posture enables wiring of the harness in an aspect close to the condition in the regular fixed posture of the information device 1, which solves a problem of the excess length of the harness and shortens the length of the harness to the minimum, thus preventing the occurrence of abnormal noises due to the excess length during driving.

After the finish of necessary works such as wiring of the harness and connection of the connectors in the temporally fixed posture, the information device 1 is held up and the hooking parts are rotated on the fulcrum to keep the information device 1 parallel with the ceiling.

Figure 5:
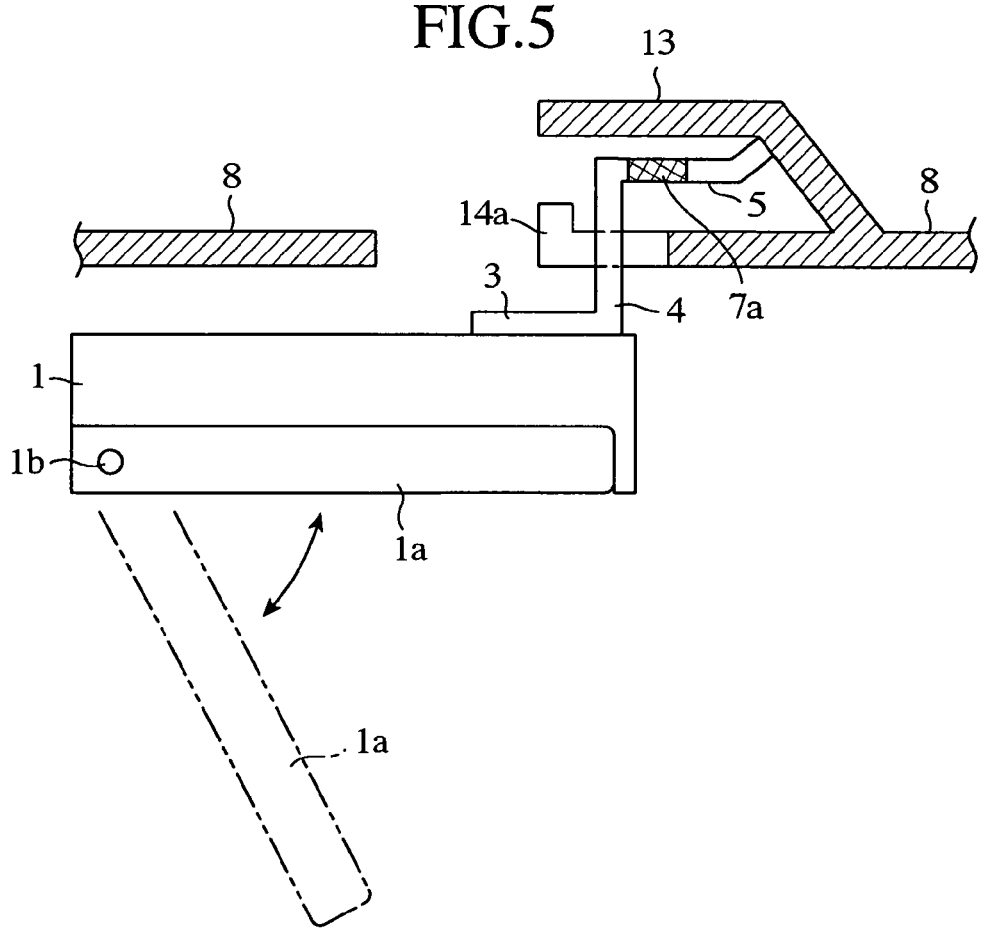
FIG. 5 is a sectional view of important parts explaining the information device in permanently fixed condition.
Figure 6:
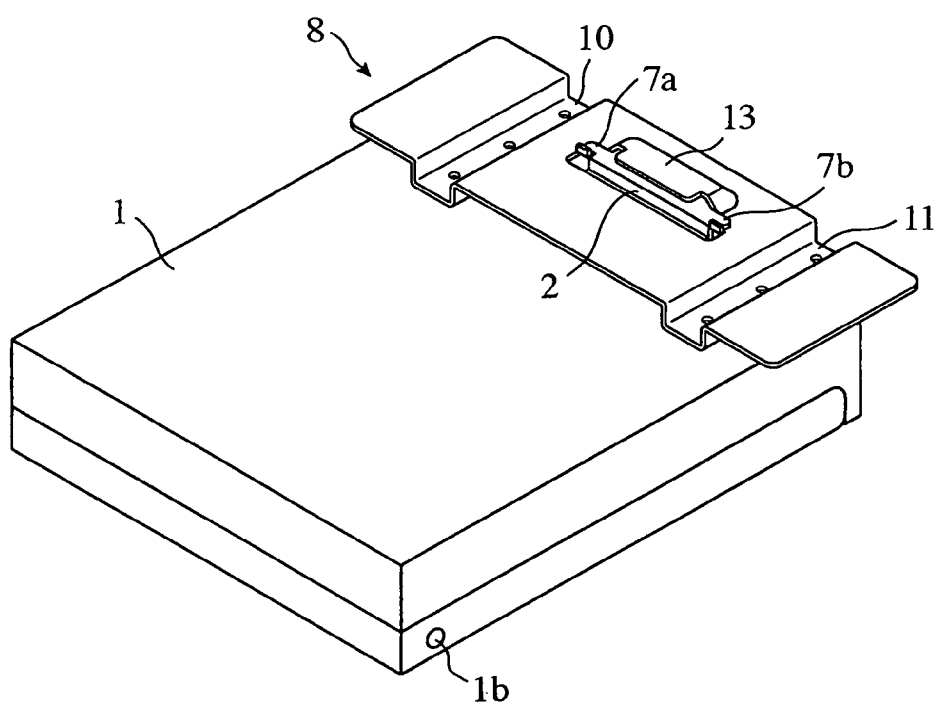
FIG. 6 is an oblique view explaining the information device in permanently fixed condition along with the ceiling bracket.

As shown in FIG. 5 and FIG. 6, the information device 1 is permanently secured by an appropriate fastening means (not shown) in the regular fixed posture at which the information device 1 is in a level position. At the time of permanent fixation of the device, abutting the end of the tabular part 5 against the inside of the roof member 13 stabilizes and strengthens the fixation thereof. At that time, when the end is bent, the bent part acts as an elastic part, thus preventing the occurrence of abnormal noises during driving caused by bumps of the body of the information device 1 against the ceiling sprung from vibrations delivered to the vehicle body during driving.

By bending the end of the tabular part 5 integrally formed with the hooking parts 7a, 7b formed on the device side bracket 2 that is provided on the information device, at a position shown by a broken line in FIG. 2, toward the ceiling, and changing a bending position of the end and the degree of bending, variations such as in the heights of the device side bracket 2 and the roof member 13 created during manufacture thereof can be absorbed.

The information device 1 supports an information display la via an supporting shaft 1b, and the information display la is opened, with the supporting shaft 1b as a fulcrum, in the regular fixed posture of the information device 1, thus allowing an occupant to receive a variety of information therefrom in the inside of the vehicle.

Second Embodiment

While In the first embodiment, the stopper stopping the rotation of the information device 1 due to the self-weight moment exerted on the information device is the up-convexed concave formed on the ceiling bracket 8, unlike the first embodiment, the feature of the second embodiment is in that the stopper is a down-convexed concave formed on the ceiling bracket 80.

In the second embodiment, as shown in FIG. 7, on the top of one end side of the information device 1 is provided with a device side bracket 2, which is functionally just the same as that of the first embodiment. Therefore, since a detailed construction of the device side bracket 2 are functionally very the same as that of the first embodiment, the corresponding constituent parts are designated by similar reference numerals, and explanations thereof are omitted for brevity's sake. Herein, a broken line 18 illustrates a bending position when the end of the tabular part 5 is bent toward the ceiling side at need.

It is a ceiling bracket 80 positioned on the ceiling in the inside of the vehicle that is shown at the upper right off to the information device 1. The ceiling bracket 80 is located under an external wall plate 9 forming the roof of the vehicle, as with the above ceiling bracket 8. However, in the second embodiment, convex piece-like hooking parts 140a, 140b, which are provided in the ceiling bracket 80, are formed on the down-convexed part thereof, i.e., on a downwardly protruding bend-plate part 130, as described later, unlike the ceiling bracket 8. The hooking parts 140a, 140b are each arranged to have the size and leave a space therebetween so that these hooking parts may hook the hooking parts 7a, 7b thereon, respectively.

Thus, because the ceiling bracket 80 has the down-convexed band-plate part 130 formed thereon and is of form having no any protrusions thereon, the bracket is effectual where it is difficult to make room above the ceiling bracket 80. When compared the ceiling bracket 80 of the second embodiment to the ceiling bracket 8 of the first embodiment, the distance from the external wall plate 9 can be more minimized than the distance t1 in FIG. 3.

The band-plate part 130 has a structure processed by means of drawing so as to be down-convexed as shown in FIG. 8 in magnified scale, and has the convex piece-like hooking parts 140a, 140b are formed on the side of the center excepting the inclined parts on both sides lengthwise. The face of the plate of the ceiling bracket 80 of this side of the band-plate part 130 has an opening 120 formed thereon. The face of the plate of the ceiling bracket 80 at the back side of the band-plate part 130 has a space 90, which goes through the underside of the ceiling bracket 80, in the form of as if the face of the plate is pushed down across the width of the band-plate part 130.

In temporarily fixing the information device 1 on the ceiling bracket 80, after the tabular part 5 of the device side bracket 2 is passed through the opening 120 from the under toward above of the ceiling bracket 80 in such a manner as feeling after a path shown by an arrow 160 in FIG. 7, while holding the information device 1 by hands, the hooking parts 7a, 7b are moved to the back side of the hooking parts 140a, 140b, and then, the hooking parts 7a, 7b are brought into engagement with the hooking parts 140a, 140b to hook the hooking parts 7a, 7b thereon by lowering the information device 1. At that time, the tabular part 5 goes through the gap 90, and the part is situated under the ceiling bracket 80. The state of the tabular part 5 at that moment is shown in FIG. 8 by a two-dot chain line.

Figure 9:
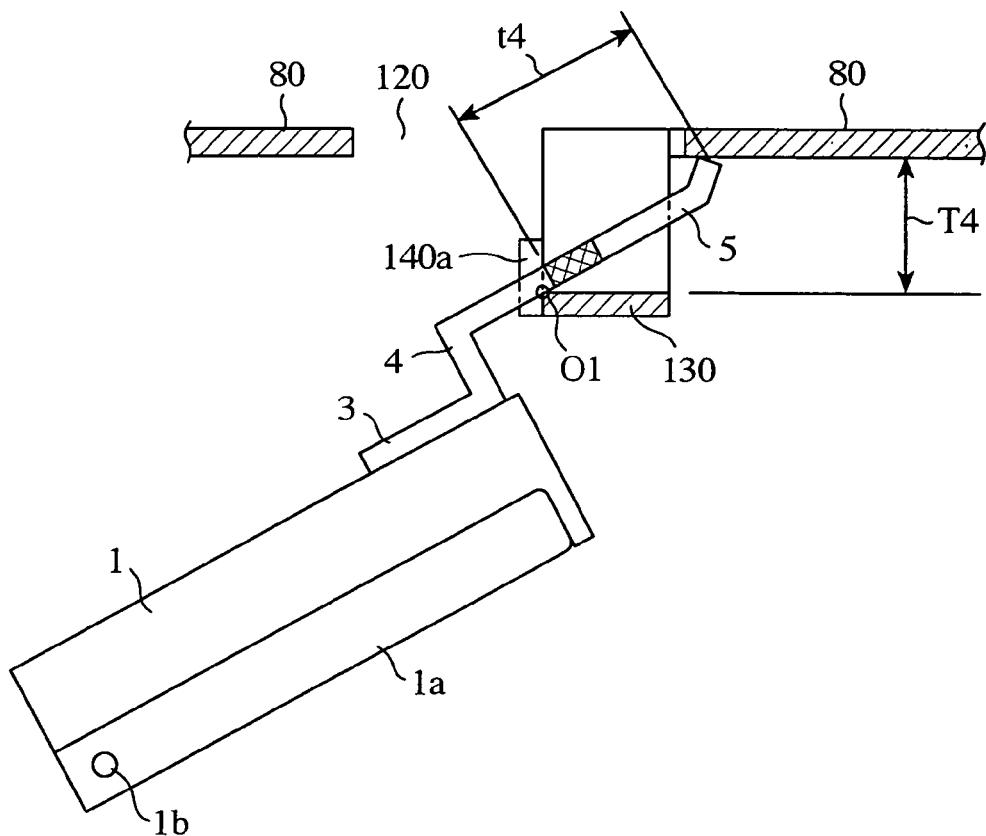
FIG. 9 is a sectional view of important parts explaining the information device in temporarily fixed condition.

Gradually relaxing a force of the hands supporting the information device 1 in such a condition results in the information device 1 being rotated, as shown in FIG. 9, due to the self-weight moment, with the contact O1 between the hooking parts 7a, 7b and the hooking parts 140a, 140b as a fulcrum. However, the end of the tabular part 5 abuts against the ceiling bracket 80 in the course of rotation and the rotation is hampered. Namely, the rotation of the information device 1 due to the self-weight moment is impeded by the abutment of the end of the tabular member 5, which is a member integrally formed with the hooking parts 7a, 7b, against the ceiling bracket 80 forming the ceiling. In other words, the ceiling bracket 80 serves as a stopper. Thus, the information device 1 is stably held at the temporally fixed posture inclined at an angle of θ to the horizontal, and is secure against falling.

This temporally fixed posture is inclined at an angle to the regular fixed position, and the rising part 4 provides a apace between the top of the information device 1 and the ceiling bracket 80, thus permitting an insertion of the connectors and wiring of the harness.

The inclination at the temporally fixed posture can be adjusted by changing the width t4 of the tabular part 5 from the end thereof to the hooking part 7a (7b) and the distance T4 between the ceiling bracket 80 and the band-plate part 130. Accordingly, a change of these dimensions according to the situations makes possible to meet a variety of circumstances. The adjustment of the inclination of the information device 1 in the temporally fixed posture to the optimum position enables the wiring of the harness in an aspect close to the regular fixed posture of the information device 1, which solves a problem of the excess length of the harness, and shortens the length of the harness to the minimum, thus preventing the occurrence of abnormal noises due to the excess length during driving.

After the finish of necessary works such as wiring of the harness and connection of the connectors in the temporally fixed posture, the information device 1 is held up.

Figure 10:
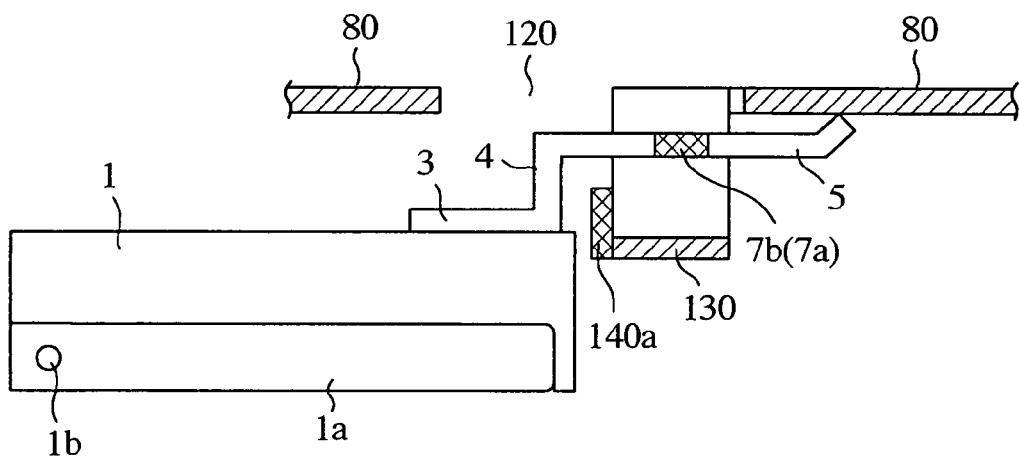
FIG. 10 is a sectional view of important parts explaining the information device in permanently fixed condition.

As shown in FIG. 10, the information device 1 is permanently secured at the regular fixed posture at which the information device 1 is in a level position by an appropriate fastening means (not shown). At the time of permanent fixation of the information device, abutting the end of the tabular part 5 against the inside of the ceiling bracket 80 stabilizes and strengthens the fixation thereof, thus preventing the occurrence of abnormal noises during driving.

By bending the end of the tabular part 5 toward the ceiling side at the position shown by a broken line in FIG. 7, and changing the bending position and the degree of bending, variations in the positions of the members such as the device side bracket 2 and band-plate part 130 created during manufacture can be absorbed. Furthermore, functioning the bent part as an elastic body allows more reduction of the occurrence of abnormal noises during driving.

INDUSTRIAL APPLICABILITY

The present invention is of wide application to the temporary fixation of the information device disposed in moving bodies such as a vehicle, an electric railcar etc, and in buildings.

The invention claimed is:

1. A temporary fixing structure for an electronic information device, comprising:
a first hooking part provided onto a ceiling of a compartment or a room;
a rising part configured to rise from a surface of the electronic information device, and formed on a bracket fixed onto the surface of the electronic information device;
a second hooking part formed on a tabular portion bent from the rising part, and rotatably hooked to the first hooking part; and
a stopper holding the electronic information device in a posture inclined against the ceiling by holding back rotation of the second hooking part due to a torque exerted on the electronic information device, which is caused by self-weight moment of said electronic information device.

2. The temporary fixing structure for the electronic information device according to claim 1, wherein the stopper comprises a roof section formed on a member integrally formed with the first hooking part to hold back the rotation of the second hooking part by abutting an end of the tabular portion.

3. The temporary fixing structure for the electronic information device according to claim 2, wherein the end of the tabular portion is bent upward.

4. The temporary fixing structure for the electronic information device according to claim 2, wherein the roof section is made of an up-convexed part formed on the member integrally formed with the first hooking part.

5. The temporary fixing structure for the electronic information device according to claim 1, wherein the stopper is made of a down-convexed part formed on a member integrally formed with the first hooking part.

6. The temporary fixing structure for the electronic information device according to claim 1, further comprising a part integrally formed with the first hooking part configured to be attached to the surface of the electronic information device by a fastening mechanism, thus securing the electronic information device in a second posture in which the surface of the electronic information device is substantially parallel to the ceiling, wherein
the posture inclined against the ceiling corresponds to a temporarily fixed posture of the electronic information device while the electronic information device is being installed in the compartment or room,
the second posture corresponds to a regular fixed posture of the electronic information device while the electronic information device is operative to convey information to a user.

7. The temporary fixing structure for the electronic information device according to claim 2, wherein the roof section abuts on the end of the tabular portion while the electronic information device is in a regular fixed posture in which the surface of the electronic information device is substantially parallel to the ceiling.

* * * * *